(12) United States Patent
Yoshikawa (10) Patent No.: US 8,870,437 B2
(45) Date of Patent: Oct. 28, 2014

(54) LIGHTING DEVICE, DISPLAY DEVICE, AND TELEVISION RECEIVER

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 203 days.

(21) Appl. No.: 13/522,614

(22) PCT Filed: Dec. 17, 2010

(86) PCT No.: PCT/JP2010/072773
§ 371 (c)(1),
(2), (4) Date: Jul. 17, 2012

(87) PCT Pub. No.: WO2011/089805
PCT Pub. Date: Jul. 28, 2011

(65) Prior Publication Data
US 2012/0293727 A1    Nov. 22, 2012

(30) Foreign Application Priority Data
Jan. 22, 2010    (JP) .................. 2010-012372

(51) Int. Cl.
*G02F 1/13357*    (2006.01)
*G02F 1/1335*    (2006.01)
*F21V 8/00*    (2006.01)

(52) U.S. Cl.
CPC ........ *G02F 1/133608* (2013.01); *G02B 6/0091* (2013.01); *G02F 1/133615* (2013.01)
USPC ............. 362/632; 362/633; 362/634; 349/58; 349/60

(58) Field of Classification Search
USPC ......... 362/600, 632, 633, 634, 611, 609, 602, 362/97.1–97.4; 349/58, 60
See application file for complete search history.

(56) References Cited

U.S. PATENT DOCUMENTS

| 6,992,736 B2 * | 1/2006 | Saito et al. ...................... 349/58 |
| 7,517,135 B2 * | 4/2009 | Yu ................................ 362/633 |

(Continued)

FOREIGN PATENT DOCUMENTS

| CN | 1580896 A | 2/2005 |
| CN | 101278151 A | 10/2008 |

(Continued)

OTHER PUBLICATIONS

Official Communication issued in International Patent Application No. PCT/JP2010/072773, mailed on Mar. 15, 2011.

*Primary Examiner* — Bao Q Truong
(74) *Attorney, Agent, or Firm* — Keating & Bennett, LLP (57) ABSTRACT

A lighting device maintains an optical design and absorbs expansion of a light guide plate with a simple structure if the light guide plate expands toward a light source side. A backlight unit 24 includes an LED board 30; an LED light sources 28 arranged on the LED board 30; a light guide plate 20 having a flat plate shape and including light entrance surfaces 20$a$1 and 20$a$2 on side surfaces that are provided on opposite sides, the light entrance surfaces 20$a$1 and 20$a$2 being arranged to face the LED light sources 28 of the LED board 30; and spacer members 25$a$ (25$b$) regulating a distance W1 between the LED board 30 and the light guide plate 20. Each spacer member 25$a$ (25$b$) has a Young's modulus smaller than that of the light guide plate 20. Each spacer member 25$a$ (25$b$) regulates the distance W1 between the LED light sources 28 and the light guide plate 20 and absorbs the expansion of the light guide plate 20.

11 Claims, 10 Drawing Sheets

(56) References Cited

U.S. PATENT DOCUMENTS

| | | | |
|---|---|---|---|
| 7,600,910 B2 * | 10/2009 | Sakai | 362/634 |
| 2007/0076433 A1 | 4/2007 | Kinoshita et al. | |
| 2007/0115691 A1 * | 5/2007 | Yu | 362/632 |
| 2007/0279944 A1 * | 12/2007 | Sakai | 362/633 |
| 2009/0231513 A1 | 9/2009 | Ohta et al. | |
| 2009/0237957 A1 * | 9/2009 | Tsubaki | 362/615 |

FOREIGN PATENT DOCUMENTS

| | | |
|---|---|---|
| CN | 201359237 Y | 12/2009 |
| JP | 2002-203418 A | 7/2002 |
| JP | 2003-234008 A | 8/2003 |
| JP | 2007-095398 A | 4/2007 |
| JP | 2008-027736 A | 2/2008 |

\* cited by examiner

LIGHTING DEVICE, DISPLAY DEVICE, AND TELEVISION RECEIVER

TECHNICAL FIELD

The present invention relates to a lighting device, a display device, and a television receiver.

BACKGROUND ART

Recently, display elements of image display devices such as a television receiver are undergoing a transition from conventional cathode-ray tubes to thin display devices using thin display elements such as liquid crystal panels and plasma display panels. Such thin display devices enable thinning and weight saving of image display devices. A liquid crystal display device requires a backlight unit as a separate lighting device because the liquid crystal panel is not self-luminous.

Patent Document 1 discloses a backlight unit including: a light guide plate having light entrance surfaces at side surfaces; a light source arranged to be opposed to the light entrance surface of the light guide plate; a light source mount on which the light source is mounted and apart of which is provided between the light source and the light guide plate; and an elastic member abutting the light source mount. In this backlight unit, when the light guide plate expands to the light source side due to heat generated during light emission of the light source, the distance between the light source and the light guide plate is regulated by the light source mount, and the distance between the light guide plate and the light source is kept within a certain range. This maintains the optical design of the backlight unit. Furthermore, the expansion of the light guide plate is absorbed by the elastic member through the light source mount.

Patent Document 1: Japanese Unexamined Patent Publication No. 2002-203418

Problem to be Solved by the Invention

In the backlight unit disclosed in Patent Document 1, the distance between the light source and the light guide plate is regulated by a part of the light source amount, and the expansion of the light guide plate is absorbed by the elastic member. In other words, a member absorbing the expansion of the light guide plate is required separately from the member regulating the distance between the light guide plate and the light source.

DISCLOSURE OF THE PRESENT INVENTION

The present invention was made in view of the foregoing circumstances. The present invention provides a lighting device configured to maintain an optical design and absorb expansion of a light guide plate with a simple structure if the light guide plate expands toward a light source.

Means for Solving the Problem

The technique disclosed herein relates to a lighting device including: a light source board; a light source arranged on a surface of the light source board; a light guide plate formed in a flat plate shape having side surfaces that are provided on opposite sides and including light entrance surfaces on the side surfaces, each of the light entrance surfaces being arranged to face the light source of the light source board; and spacer members configured to regulate a distance between the light source board and the light guide plate. Each of the spacer members has Young's modulus smaller than Young's modulus of the light guide plate.

According to the lighting device disclosed herein, since the Young's modulus of each spacer member is smaller than the Young's modulus of the light guide plate, expansion of the light guide plate can be absorbed by the spacer member if the light guide plate expands toward the light source. Further, if the light guide plate expands toward the light source side, the distance between the light source board and the light guide plate can be regulated by the spacer member with an equal load at each side surface of the light guide plate facing the light source. This makes it possible to maintain the equal distance between the light source and the light guide plate at each side surface of the light guide plate facing the light source. Accordingly, each of the spacer members functions to regulate the distance between the light source and the light guide plate and to absorb the expansion of the light guide plate. This eliminates the need to provide a member for absorbing the expansion of the light guide plate separately from the space members in the lighting device described above, and accordingly, it is achieved with a simple structure that an optical design is maintained and the expansion of the light guide plate is absorbed if the light guide plate expands toward the light source side.

In the lighting device described above, Young's modulus of the spacer member provided close to one of the light entrance surfaces of the light guide plate may be different from Young's modulus of the spacer member provided close to another one of the light entrance surfaces of the light guide plate.

If the lighting device is mounted in a vertically disposed state, for example, a load due to the weight of the light guide plate may be applied only to the spacer members provided below the light guide plate. In this case, only the spacer members provided below the light guide plate are compressed, and the distance between the light guide plate and the light source below the light guide plate may be smaller than the distance between the light guide plate and the light source above the light guide plate. According to the configuration described above, if the lighting device is mounted in a vertically disposed manner, the Young's modulus of the spacer members provided below the light guide plate can be set to be larger than the Young's modulus of the spacer members provided above the light guide plate. This makes it possible to support the light guide plate without excessively compressing the spacer members provided below the light guide plate even if the load due to the weight of the light guide plate is applied only to the spacer members provided below the light guide plate. As a result, the distance between the light guide plate and the light source provided below the light guide plate and the distance between the light guide plate and the light source provided above the light guide plate can be kept at an equal distance, thereby making it possible to effectively maintain the optical design of the lighting device.

In the lighting device described above, each of the spacer members may include a plate spring that is elastically deformed in a direction vertical to the light entrance surfaces of the light guide plate. According to this configuration, if the light guide plate expands toward the light source, the plate spring of each of the spacer members is deformed in the direction vertical to the light entrance surfaces of the light guide plate due to a pressing force caused by the expansion of the light guide plate. This allows the spacer members to effectively absorb the expansion of the light guide plate.

In the lighting device described above, an elastic modulus of the plate spring of the spacer member provided close to one of the light entrance surfaces of the light guide plate is different from elastic modulus of the plate spring of the spacer member provided close to another one of the light entrance surfaces.

In the spacer members including the plate spring, the shape of each plate spring may be varied to vary the elastic modulus of each plate spring. According to the configuration described above, if the lighting device is mounted in a vertically disposed manner, the elastic modulus of the plate spring of the spacer member provided below the light guide plate can be set to be smaller than the elastic modulus of the plate spring of the spacer member provided above the light guide plate. This makes it possible to support the light guide plate without excessively compressing the spacer member provided below the light guide plate even if the load due to the weight of the light guide plate is applied only to the spacer member provided below the light guide plate. As a result, the distance between the light guide plate and the light source provided below the light guide plate and the distance between the light guide plate and the light source provided above the light guide plate can be kept at an equal distance, thereby making it possible to effectively maintain the optical design of the lighting device.

The lighting device described above may further include a housing member housing at least the light source board and the light guide plate. The spacer members may be arranged on a surface of the housing member between the light source board and the light guide plate, and may be fixed to the housing member. According to this configuration, the spacer members are fixed to the surface of the housing member, thereby stabilizing the spacer members.

The lighting device described above may further include a board holding member fixed to the surface of the housing member and configured to hold the light source board. The spacer members may be arranged on the surface of the board holding member. According to this configuration, the spacer members can be fixed to the housing member, while the light source board is fixed to the surface of the housing member through the board holding member.

In the lighting device described above, the spacer members arranged close to one of the light entrance surfaces of the light guide plate and the spacer members arranged close to another one of the light entrance surfaces may be arranged in a mirror symmetrical manner. According to this configuration, the distance between the light source board and the light guide plate can be effectively regulated with an equal load at the side surfaces of the light guide plate on which the spacer members are arranged. Consequently, the isotropic expansion of the light guide plate can be secured and the optical design of the lighting device can be effectively maintained.

In the lighting device described above, the spacer members and the light guide plate may abut each other with no load applied therebetween under a temperature condition of 25° C. According to this configuration, the spacer members can be kept in the state of abutting the light guide plate with no load applied thereto under a temperature condition of room temperature (25° C.) at which the production design is facilitated. Accordingly, if the light guide plate expands toward the light source, the distances between the light source board and the light guide plate can be effectively regulated with an equal load at the side surfaces of the light guide plate on which the spacer members are arranged. Consequently, the isotropic expansion of the light guide plate can be secured and the optical design of the lighting device can be effectively maintained.

The lighting device described above may further include a reflection member arranged between the light source and the light guide plate. Each of the light entrance surfaces may be formed in an elongated shape and the reflection member may be arranged along a longitudinal direction of the light entrance surface. According to this configuration, the reflection member allows light scattered from the light source to the outside of the light guide plate to enter the light guide plate. This makes it possible to suppress leakage of light to the outside of the light guide plate and to enhance the use efficiency of the light emitted from the light source.

The technique disclosed herein can also be expressed as a display device including a display panel performing display using light from the lighting device described above. Further, a display device including a liquid crystal panel using a liquid crystal as the display panel is also novel and useful. Furthermore, a television receiver including the display device described above is also novel and useful. The display device and the television receiver described above can achieve an increase in area of a display region.

Advantageous Effect of the Invention

According to the technique disclosed herein, it is possible to provide a lighting device configured to maintain an optical design of a backlight unit and absorb expansion of a light guide plate toward a light source with a simple structure.

BEST MODE FOR CARRYING OUT THE INVENTION

First Embodiment

Embodiments will be described with reference to the drawings. Note that an X-axis, a Y-axis, and a Z-axis are shown in a part of each figure, and axial directions are illustrated as common directions in each figure. Among these directions, the Y-axial direction is aligned with the vertical direction, and the X-axial direction is aligned with the horizontal direction. Unless explicitly specified otherwise, descriptions as to the upper and lower sides are made with reference to the vertical direction.

Figure 1:
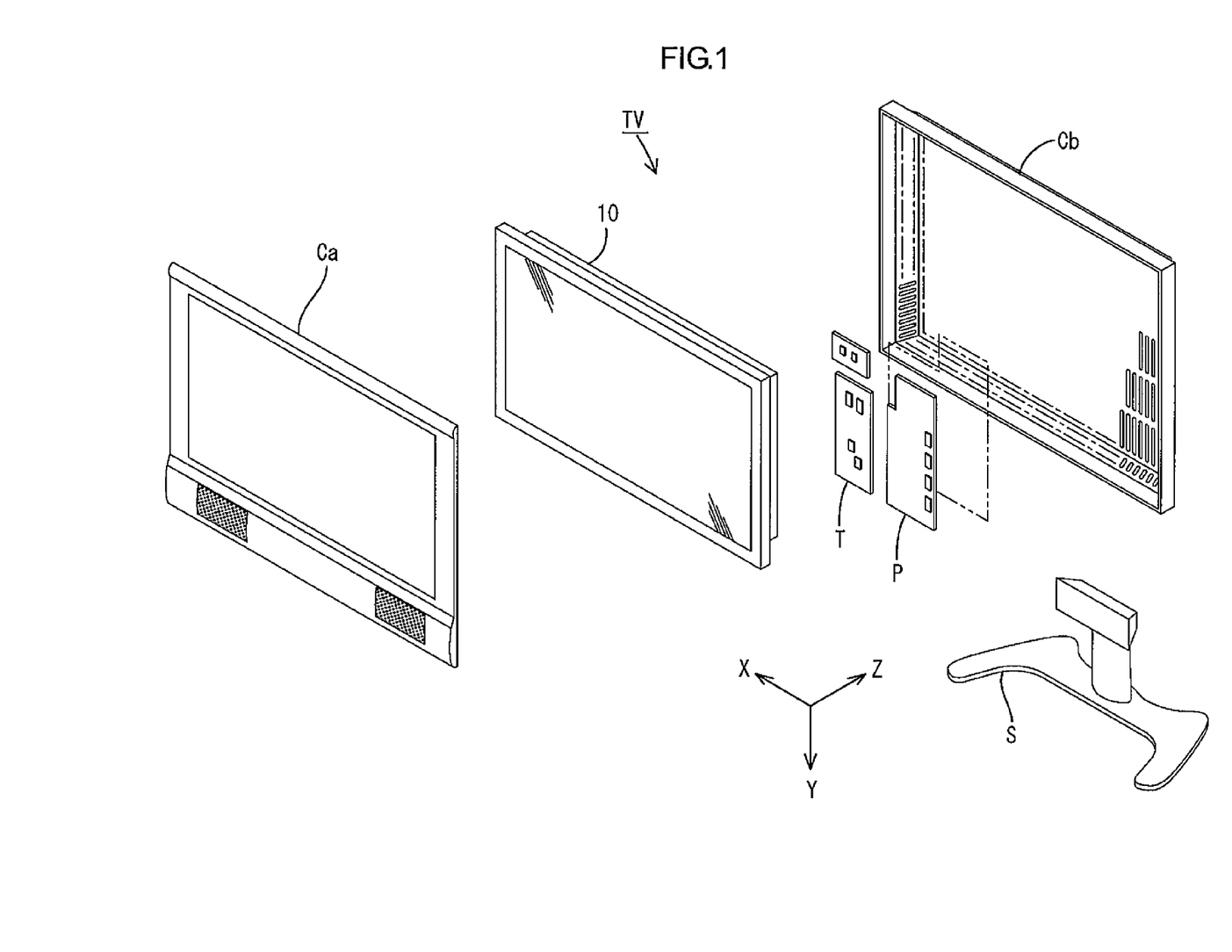
FIG. 1 is an exploded perspective view of a television receiver TV according to a first embodiment of the present invention.

FIG. 1 shows an exploded perspective view of a television receiver TV according to a first embodiment. As shown in FIG. 1, the television receiver TV includes a liquid crystal display device 10, front and back cabinets Ca and Cb sandwiching to house the liquid crystal display device 10, a power source P, a tuner T, and a stand S.

Figure 2:
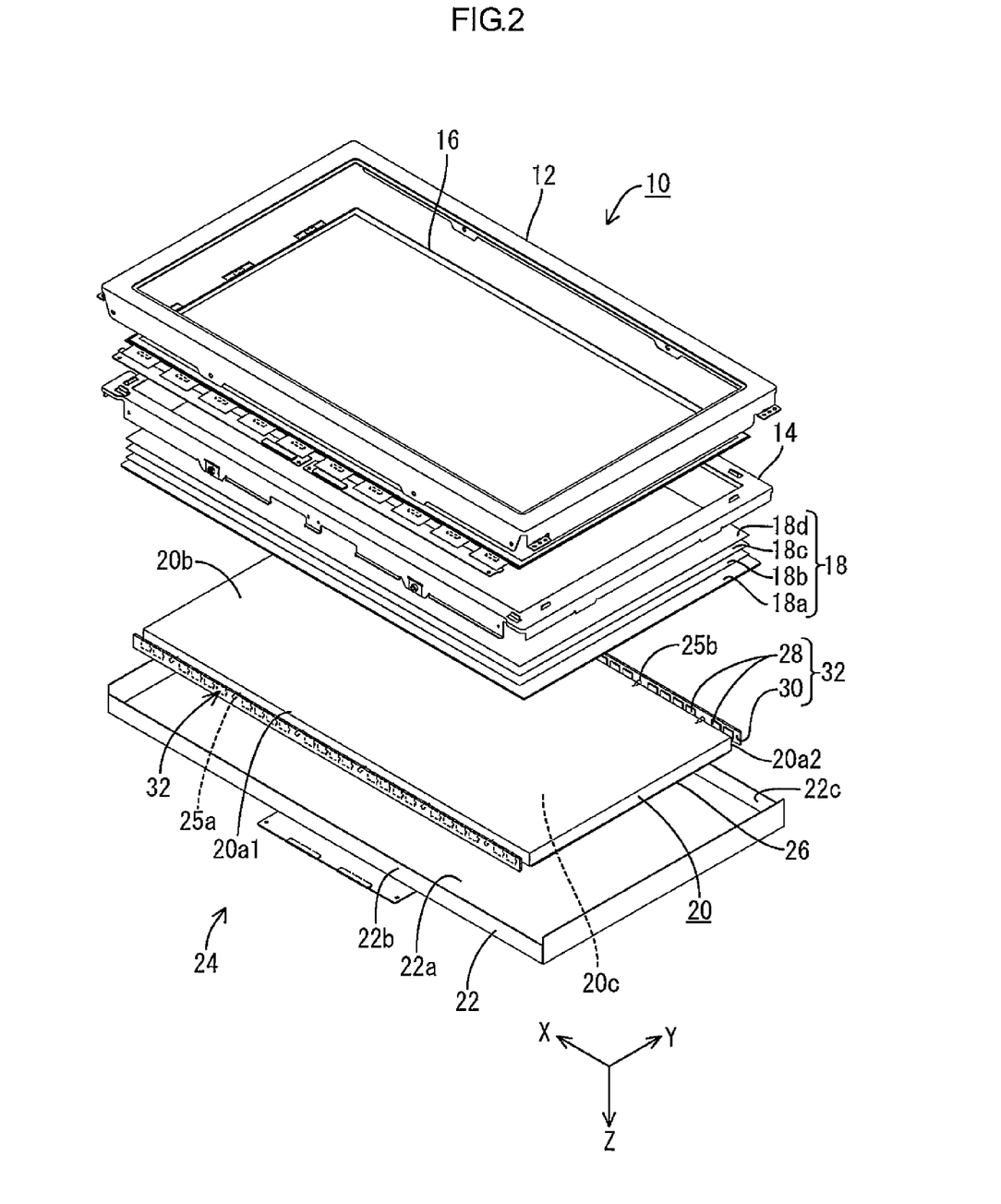
FIG. 2 is an exploded perspective view of a liquid crystal display device 10.

FIG. 2 shows an exploded perspective view of the liquid crystal display device 10. Herein, the upper side shown in FIG. 2 is assumed as the front side and the lower side shown in FIG. 2 is assumed as the back side. As shown in FIG. 2, the liquid crystal display device 10 has a horizontally-long rectangular shape as a whole and includes a liquid crystal panel 16 serving as a display panel, and a backlight unit 24 serving as an external light source. These are integrally held by a bezel 12 having a frame shape or the like.

Next, the liquid crystal panel 16 will be described. The liquid crystal panel 16 has a configuration where a pair of transparent (highly light transmissive) glass substrates is bonded together with a predetermined gap therebetween and a liquid crystal layer (not shown) is encapsulated between the both glass substrates. One of the glass substrates is provided with switching components (for example, TFTs) connected to source lines and gate lines, which are orthogonal to each other, pixel electrodes connected to the switching components, and an alignment film, for example. The other glass substrate is provided with a color filter in which color sections of R (red), G (green), B (blue), and the like are arranged in a predetermined array, a counter electrode, and an alignment film, for example. Among these, the source lines, the gate lines, the counter electrode, and the like are supplied with image data and various control signals necessary for displaying an image from a drive circuit board which is not shown. Note that polarizing plates (not shown) are arranged on the outside of the both glass substrates.

Next, the backlight unit 24 will be described. As shown in FIG. 2, the backlight unit 24 includes a backlight chassis 22, an optical member 18, and a frame 14. The backlight chassis 22 has a substantially box shape opened to the front side (a light exit side; a side of the liquid crystal panel 16). The optical member 18 is arranged to cover the opening of the backlight chassis 22. The frame 14 has a frame shape and is arranged to surround the optical member 18. Further, the backlight chassis 22 houses a pair of LED (Light Emitting Diode) units 32 and a light guide plate 20. The pair of LED units 32, 32 is arranged at outer edges on both long sides of the backlight chassis 22 and emits light. The light guide plate 20 is arranged between the pair of LED units 32, 32 and guides light emitted from the LED units 32 to the side of the liquid crystal panel 16. The optical member 18 is mounted on the front side of the light guide plate 20. In this embodiment, the backlight unit 24 employs a so-called edge light system (side light system) in which the light guide plate 20 and the optical member 18 are arranged immediately below the liquid crystal panel 16 and the LED units 32 serving as light sources are arranged at side ends of the light guide plate 20.

The backlight chassis 22 is made of metal, such as an aluminum-based material, and is formed of a bottom plate 22a having a rectangular shape in plan view, and side plates 22b and 22c rising from the outer edges on both long sides and both short sides of the bottom plate 22a to the front side. The long-side direction of the bottom plate 22a is aligned with the horizontal direction (X-axial direction), and the short-side direction thereof is aligned with the vertical direction (Y-axial direction). A space surrounded by the pair of LED units 32, 32 in the backlight chassis 22 is a space housing the light guide plate 20. A power supply circuit board or the like supplying power to the LED units 32 is mounted on the back side of the bottom plate 22a.

The optical member 18 has a configuration where a diffuser plate 18a, a diffuser sheet 18b, a lens sheet 18c, and a reflection type polarizing plate 18d are stacked in this order from the side of the light guide plate 20. The diffuser sheet 18b, the lens sheet 18c, and the reflection type polarizing plate 18d have a function of making the light emitted from the LED units 32 and passing through the diffuser plate 18a into planar light. The liquid crystal panel 16 is placed on the upper surface side of the reflection type polarizing plate 18d, and the optical member 18 is arranged between the light guide plate 20 and the liquid crystal panel 16.

The LED units 32 have a configuration where LED light sources 28 emitting white light and spacer members 25a (25b) are aligned parallel to each other in a line on an LED board 30 which is made of a resin and has a rectangular shape. The spacer members 25a (25b) are arranged at regular intervals between the plurality of LED light sources 28. Note that the spacer members 25a (25b) will be described in detail with reference to other figures. The pair of LED units 32, 32 is mounted by screwing, for example, to the long-side outer edges 22b and 22c of the backlight chassis 22 such that the LED light sources 28 and the spacer members 25a (25b) on each of the LED units 32 face each other.

The light guide plate 20 is a plate-like member having a rectangular shape and formed of a resin having high light transmissive capability (having high transparency) such as acrylic. As shown in FIG. 2, the light guide plate 20 is arranged between the LED units 32 facing each other such that the main plate surface (light exit surface) 20b is directed to the side of the diffuser plate 18a. Further, in the light guide plate 20, a reflection sheet 26 is arranged on a surface 20c opposite to the surface facing the diffuser plate 18a. This reflection sheet 26 functions to return the light again to the inside of the light guide plate 20 by reflecting the light leaking from the light guide plate 20. The arrangement of the light guide plate 20 allows the light generated by the LED units 32 to be incident on side plate surfaces (light entrance surfaces) 20a1 and 20a2 of the light guide plate 20 and exit from the principal plate surface facing the diffuser plate 18a, thereby irradiating the liquid crystal panel 16 from the back surface side thereof.

Figure 3:
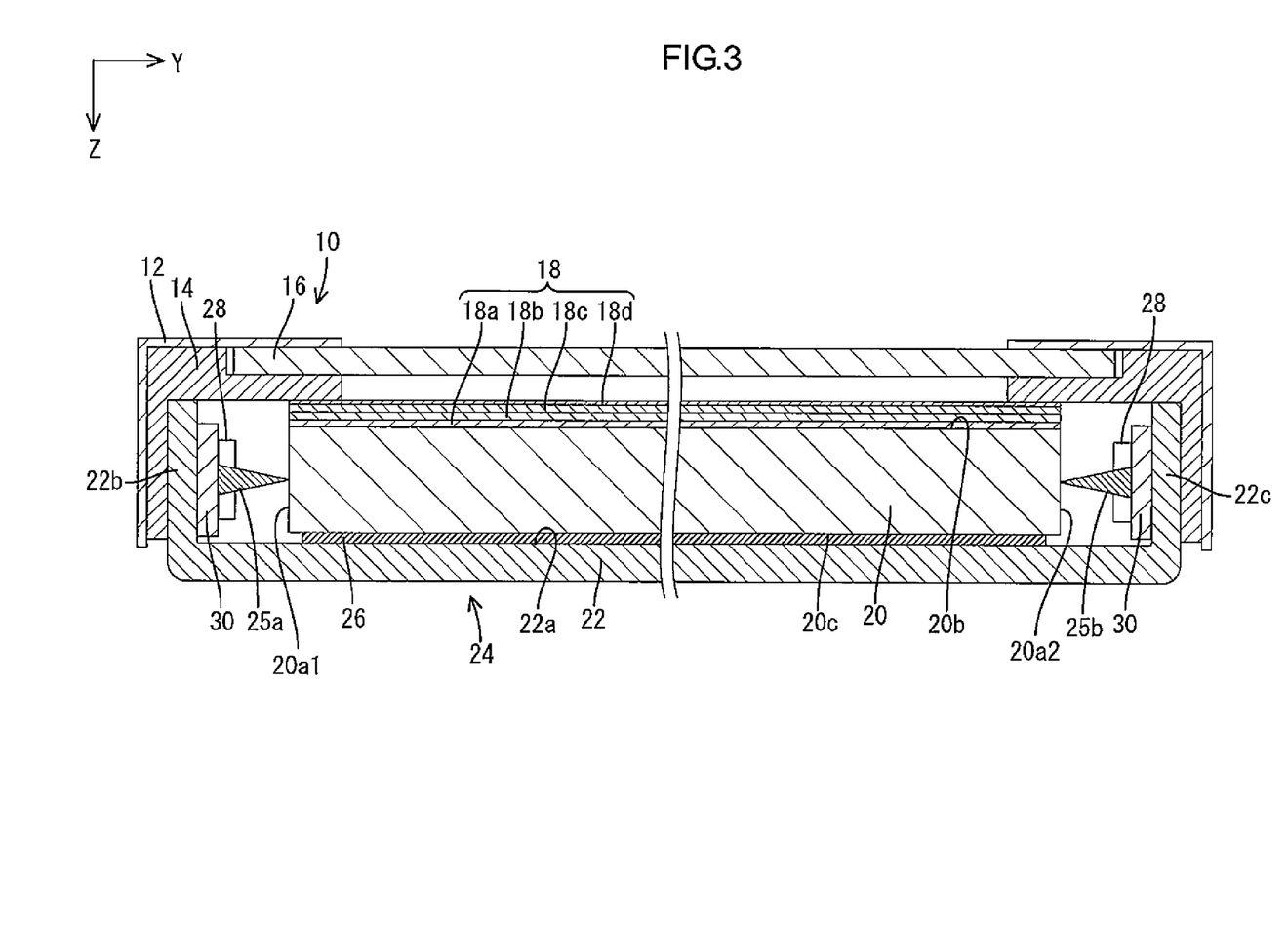
FIG. 3 is a sectional view of the liquid crystal display device 10.

FIG. 3 shows a sectional view of the liquid crystal display device 10. The sectional view of FIG. 3 shows a sectional configuration when the liquid crystal display device 10 is viewed in cross section along a Y-Z plane passing through the spacer members 25a (25b). As shown in FIG. 3, the spacer members 25a (25b) are arranged between the LED board 30 and the light guide plate 20. The spacer members 25a (25b) are adhered to the surface of the LED board 30, for example, thereby being fixed to the surface of the LED board 30. The spacer members 25a (25b) are formed of a material having a Young's modulus smaller than that of the light guide plate 20.

As the material forming the spacer members 25a (25b), PC (polycarbonate), PBT (polybutylene terephthalate), silicon rubber, ABS (acrylonitrile butadiene styrene) resin, and the like may be used. For example, when the light guide plate 20 is formed of acrylic resins, these materials generally has the Young's modulus smaller than the Young's modulus of the light guide plate 20.

Figure 4:
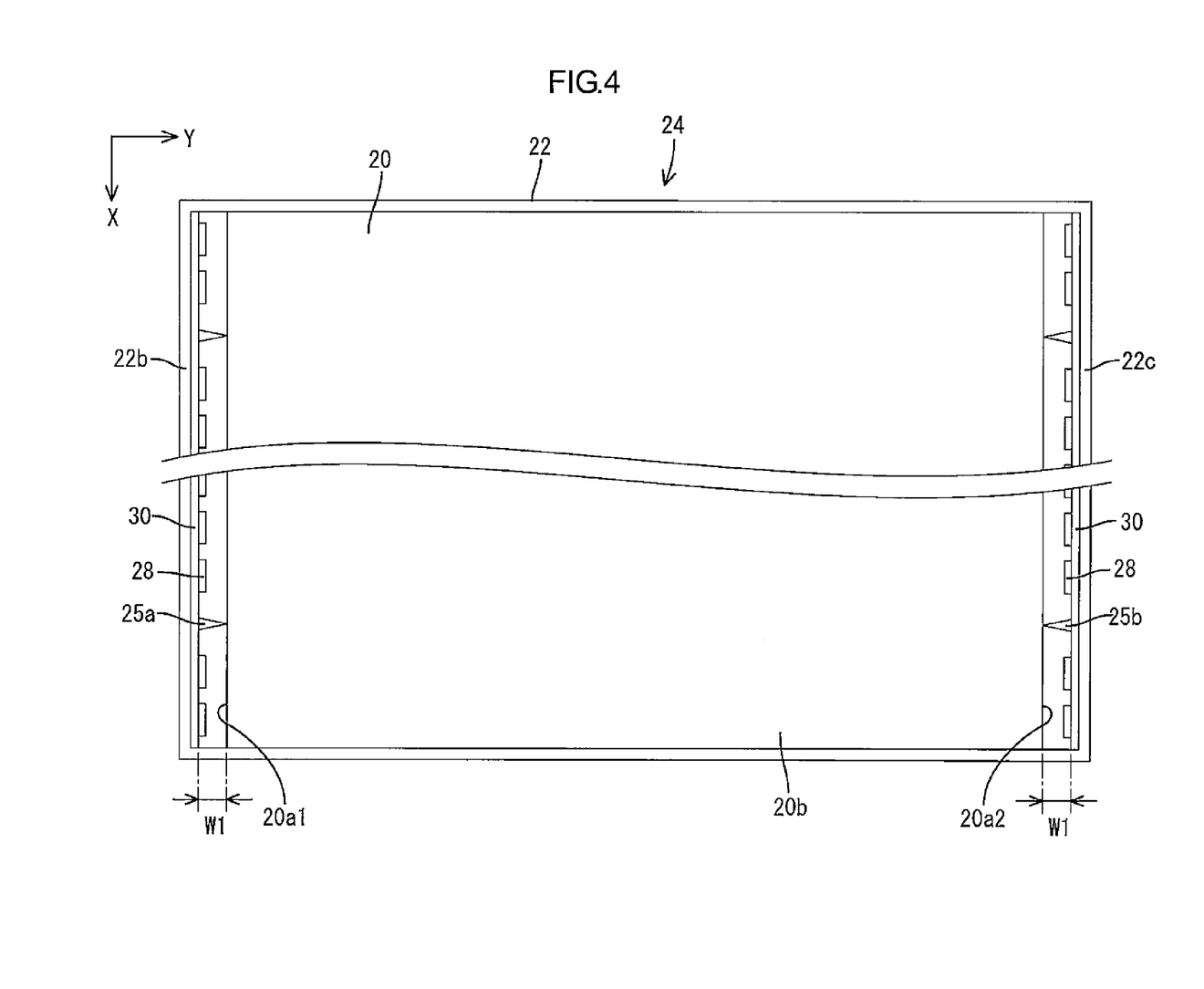
FIG. 4 is a schematic plan view of a backlight unit 24.

FIG. 4 shows a schematic plan view of the backlight unit 24. As shown in FIG. 4, a distance W1 between the LED board 30 and the light guide plate 20 is regulated by the spacer members 25a (25b), and the distance W1 between the LED light sources 28 and the light guide plate 20 is kept within a certain range. The spacer members 25a arranged on the side of one light entrance surface 20a1 of the light guide plate 20 and the spacer members 25b arranged on the side of the light entrance surface 20a2 facing the light entrance surface 20a1 are formed in a mirror symmetrical manner. Note that the height of each of the spacer members 25a (25b) is adjusted so as to abut the light entrance surface 20a1 (20a2) of the light guide plate 20 with no load applied between each spacer member and the light guide plate 20 under a temperature condition of 25° C. If the light guide plate 20 expands toward the LED light sources 28, the spacer members 25a (25b) are displaced in the vertical direction and the spacer members 25a (25b) are compressed. Therefore, the expansion of the light guide plate 20 is absorbed by the spacer members 25a (25b).

The backlight unit 24 (liquid crystal display device 10) may be incorporated as a component of the television receiver TV, and may be mounted in a vertically disposed manner after the production of the television receiver TV. The spacer members 25a (25b) are provided above and below the light guide plat 20 when the backlight unit 24 is mounted in a vertically disposed manner. At this time, the spacer members 25a arranged on the side of one light entrance surface 20a1 of the light guide plate 20 are provided below the light guide plate 20, and the spacer members 25b arranged on the side of the light entrance surface 20a2 facing the light entrance surface 20a1 are provided above the light guide plate 20. When the backlight unit 24 is mounted in a vertically disposed manner, the spacer members 25a provided below the light guide plate 20 are formed of a material having a Young's modulus larger than that of the material forming the spacer members 25b provided above the light guide plate 20.

The television receiver TV of this embodiment has been described in detail above. In the backlight unit 24 of the television receiver TV according to this embodiment, the Young's modulus of each of the spacer members 25a (25b) is smaller than the Young's modulus of the light guide plate. This allows the spacer members 25a (25b) to absorb the expansion of the light guide plate 20 when the light guide plate 20 expands to the side of the LED light sources 28. Further, when the light guide plate 20 expands toward the LED light sources 28, the distance between the LED board 30 and the light guide plate 20 can be regulated with an equal load by the spacer members 25a (25b) at the side surfaces 20a1 and 20a2 of the light guide plate 20 facing the LED light sources 28. This makes it possible to keep the equal distance between the LED light sources 28 and the light guide plate 20 at the side surfaces of the light guide plate 20 facing the LED light sources 28. That is, the spacer members 25a (25b) function to regulate the distance W1 between the LED light sources 28 and the light guide plate 20 and to absorb the expansion of the light guide plate 20. This eliminates the need to provide a member for absorbing the expansion of the light guide plate 20 separately from the spacer members 25a (25b) in the backlight unit 24 of this embodiment, and this allows the optical design of the backlight unit 24 to be maintained with a simple structure, while absorbing the expansion of the light guide plate 20 when the light guide plate 20 expands to the side of the LED light sources 28.

In the embodiment described above, when the light guide plate 20 is displaced in the plane direction due to the expansion, the distance between the LED board 30 and the light guide plate 20 can be regulated with an equal load at the side surfaces of the light guide plate 20 facing the LED light sources 28. Accordingly, the isotropic expansion of the light guide plate 20 can be secured.

In the embodiment described above, when the backlight unit 24 is mounted in a vertically disposed manner, the Young's modulus of the spacer members 25a provided below the light guide plate 20 is larger than the Young's modulus of the spacer members 25b provided above the light guide plate 20. This makes it possible to support the light guide plate 20 without excessively compressing the spacer members 25a provided below the light guide plate 20 even when the load due to the weight of the light guide plate 20 is applied only to the spacer members 25a provided below the light guide plate 20. As a result, the distance between the light guide plate 20 and the LED light sources 28 provided below the light guide plate 20 and the distance between the light guide plate 20 and the LED light sources 28 provided above the light guide plate 20 can be kept at an equal distance, thereby making it possible to effectively maintain the optical design of the backlight unit 24.

Further, in the embodiment described above, the spacer members 25a (25b) arranged on the side of one light entrance surface 20a1 of the light guide plate 20 and the spacer members 25b (25a) arranged on the side of the light entrance surface 20a2 facing the light entrance surface 20a1 are formed in a mirror symmetrical manner. Accordingly, the distances between the LED board 30 and the light guide plate 20 can be effectively regulated with an equal load at the side surfaces facing each other of the light guide plate 20 on which the spacer members 25a (25b) are arranged. Consequently, the isotropic expansion of the light guide plate 20 can be secured and the optical design of the backlight unit 24 can be effectively maintained.

Furthermore, in the embodiment described above, the spacer members 25a (25b) and the light guide plate 20 abut each other with no load applied therebetween under a temperature condition of 25° C. This allows the spacer members 25a (25b) to be kept in the state of abutting the light guide plate 20 with no load applied thereto under a temperature condition of room temperature (25° C.) at which the production design is facilitated. Accordingly, when the light guide plate 20 expands to the side of the LED light sources 28, the distance between the LED board 30 and the light guide plate 20 can be effectively regulated with an equal load at the side surfaces of the light guide plate 20 on which the spacer members 25a (25b) are arranged. Consequently, the isotropic expansion of the light guide plate 20 can be secured and the optical design of the backlight unit 24 can be effectively maintained.

Note that this embodiment illustrates an aspect in which the spacer members 25a (25b) and the backlight chassis 24 are separate members. Alternatively, the spacer members 25a (25b) and the backlight chassis 24 may be integrally formed to thereby form the spacer members 25a (25b) as apart of the backlight chassis 24.

Second Embodiment

Figure 5:
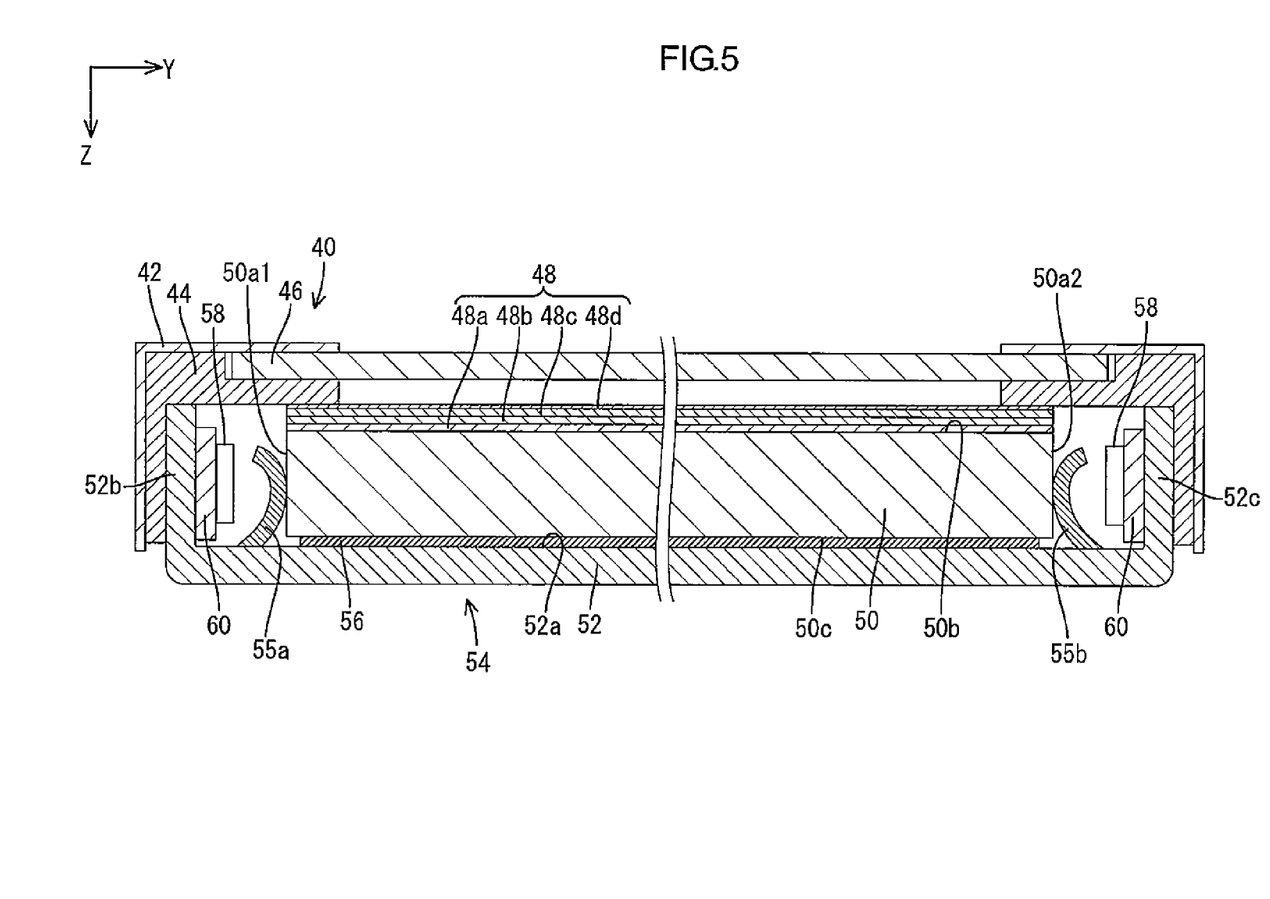
FIG. 5 shows a sectional view of a liquid crystal display device 40 according to a second embodiment.

FIG. 5 shows a sectional view of a liquid crystal display device 40 according to a second embodiment. The sectional view of FIG. 5 shows a sectional configuration when a liquid crystal display device 40 is viewed in cross section along a Y-Z plane passing through spacer members 55a (55b). The second embodiment differs from the first embodiment in the form and layout of the spacer members 55a (55b). The other components are the same as those of the first embodiment described above. In FIG. 5, the members denoted by reference numeral obtained by adding the number 30 to the reference numeral of the corresponding member in FIG. 3 are identical with the members described in the first embodiment, so the description of the structure, operation, and effect thereof is omitted.

In the liquid crystal display device 40 of the second embodiment, each of the spacer members 55a (55b) includes a plate spring. Each of the spacer members 55a (55b) including a plate spring is adhered to a bottom plate 52a of a backlight chassis 52, for example, thereby being fixed thereto and extends to the front side of a backlight unit 54 from the bottom plate 52a of the backlight chassis 52. The plate spring of each of the spacer members 55a (55b) has a curved shape to be warped to the side of a light entrance surface 50a1 (50a2) of a light guide plate 50, and has elasticity in a direction vertical to the light entrance surface 50a1 (50a2) of the light guide plate 50. Further, the curved portion of the plate spring of each of the spacer members 55a (55b) abuts the light entrance surface 50a1 (50a2) of the light guide plate 50, thereby regulating the displacement of the light guide plate 50 to the side of LED light sources 58. Note that as the material forming the spacer members 55a (55b) including the plate spring, not only the resin material described in the first embodiment, but also zinc-coated steel, aluminum, stainless steel, and the like may be used.

Figure 6:
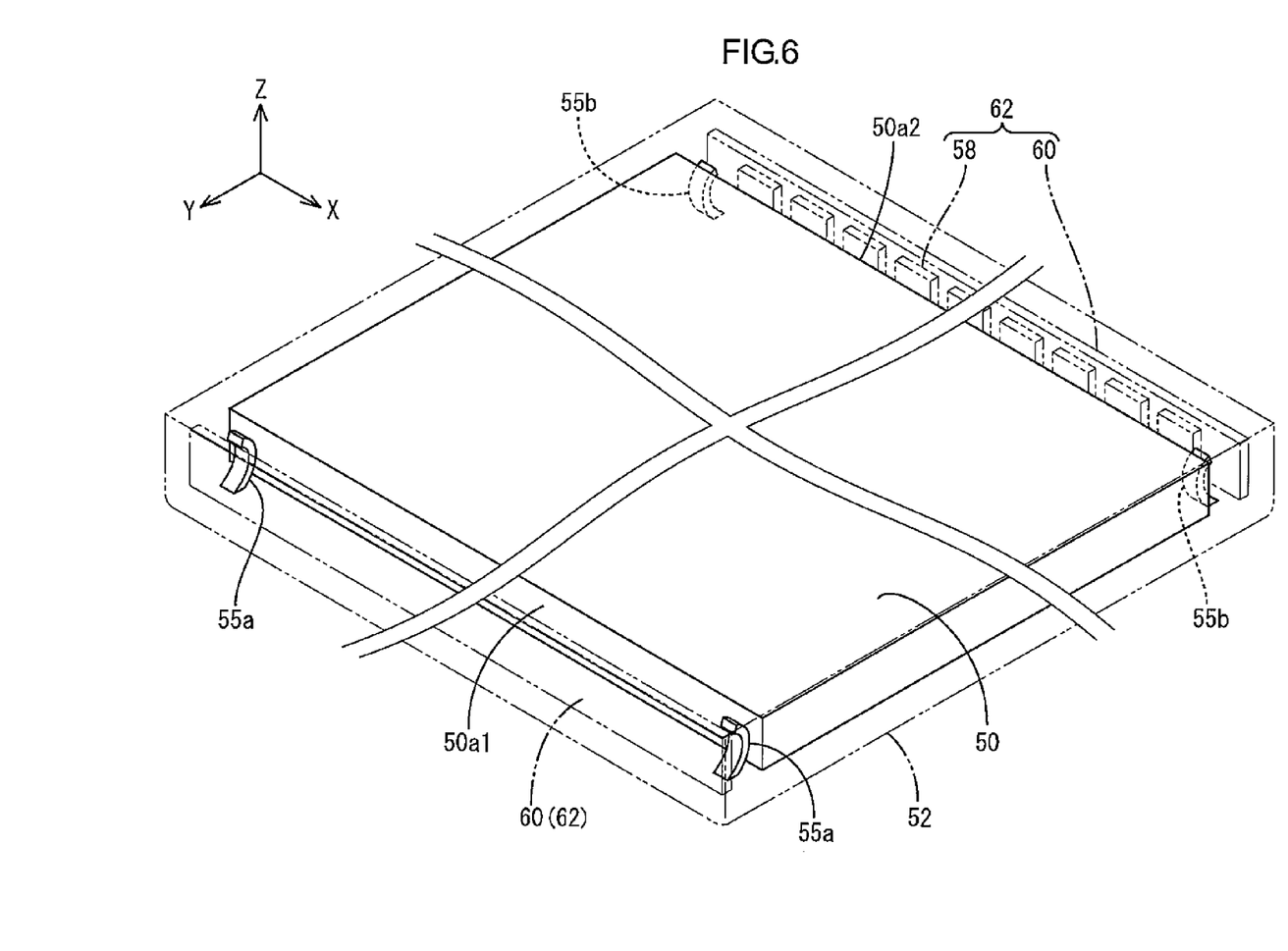
FIG. 6 shows a perspective view of a backlight unit 54 according to the second embodiment.

FIG. 6 shows a perspective view of the backlight unit 54. Note that in FIG. 6, a pair of LED units 62, 62 and the backlight chassis 52 are illustrated to be seen through for convenience of explanation. As shown in FIG. 6, the spacer members 55a (55b) are arranged at both ends in the long-side direction of the backlight chassis 52. This prevents the light, which is emitted from the LED light sources 58 to the light entrance surface 50a1 (50a2) of the light guide plate 50, from being blocked by the spacer members 55a (55b).

In the backlight unit 54, when the backlight unit 54 is mounted in a vertically disposed manner, the elastic modulus of each plate spring of the spacer members 55a provided below the light guide plate 50 is smaller than the elastic modulus of each plate spring of the spacer members 55b provided above the light guide plate 50. Specifically, the curvature of each plate spring of the spacer members 55a provided below the light guide plate 50 is smaller to the side of the light entrance surface 50a1 (50a2) of the light guide plate 50, compared with the curvature of each plate spring of the spacer members 55b provided above the light guide plate 50. Accordingly, when the backlight unit 54 is mounted in a vertically disposed manner, each plate spring of the spacer members 55a provided below the light guide plate 50 is hardly deformed in the direction vertical to the light entrance surface 50a1 (50a2) of the light guide plate 50, compared with each plate spring of the spacer members 55b provided above the light guide plate 50.

In the backlight unit 54 of the second embodiment, the spacer members 55a (55b) include the plate spring having elasticity in the direction vertical to the light entrance surface 50a1 (50a2) of the light guide plate 50. Accordingly, when the light guide plate 50 expands to the side of the LED light sources 58, each plate spring of the spacer members 55a (55b) is deformed in the direction vertical to the light entrance surface 50a1 (50a2) of the light guide plate 50 due to a pressing force caused by the expansion of the light guide plate 50. This allows the spacer members 55a (55b) to effectively absorb the expansion of the light guide plate 50.

In the backlight unit 54 of the second embodiment, when the backlight unit 54 is mounted in a vertically disposed manner, each plate spring of the spacer members 55a provided below the light guide plate 50 has an elastic modulus smaller than that of each plate spring of the spacer members 55b provided above the light guide plate 50. This makes it possible to support the light guide plate 50 without excessively compressing the spacer members 55a provided below the light guide plate 50 even when the load due to the weight of the light guide plate 50 is applied only to the spacer members 55a provided below the light guide plate 50. As a result, the distance between the light guide plate 50 and the LED light sources 58 provided below the light guide plate 50 and the distance between the light guide plate 50 and the LED light sources 58 provided above the light guide plate 50 can be kept at an equal distance, thereby making it possible to effectively maintain the optical design of the backlight unit 54.

In the backlight unit 54 of the second embodiment, the spacer members 55a (55b) are arranged on the surface of the backlight chassis 52 provided between an LED board 60 and the light guide plate 50, and are fixed to the backlight chassis 52. This stabilizes the spacer members 55a (55b).

Note that this embodiment illustrates an aspect in which the spacer members 55a (55b) are arranged on the surface of the backlight chassis 52 provided between the LED board 58 and the light guide plate 50. Alternatively, an aspect may be employed in which the spacer members 55a (55b) are arranged on the surface of a frame 44 provided between the LED board 58 and the light guide plate 50.

Third Embodiment

Figure 7:
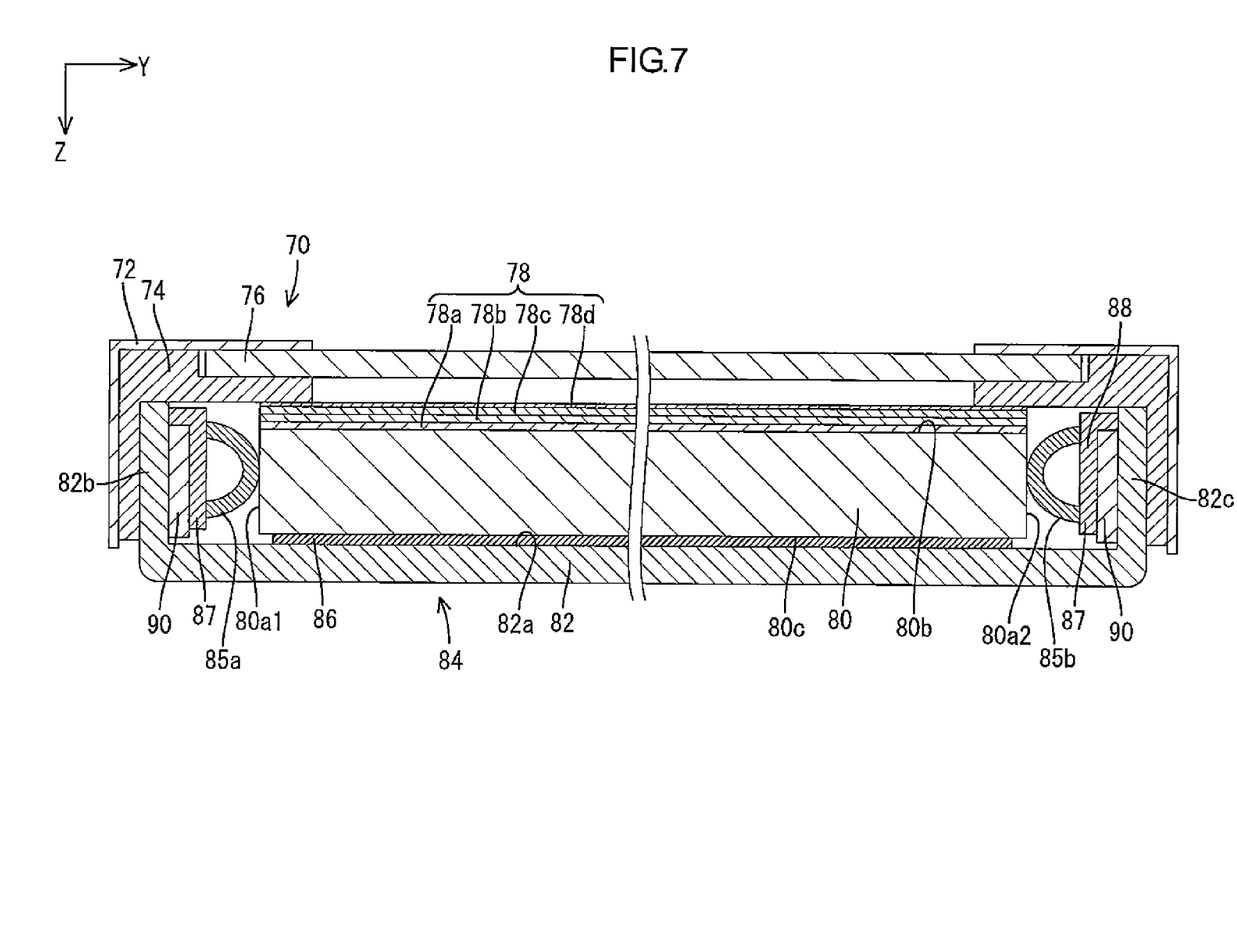
FIG. 7 shows a sectional view of a liquid crystal display device 70 according to a third embodiment.

FIG. 7 shows a sectional view of a liquid crystal display device 70 according to a third embodiment. The sectional view of FIG. 7 shows a sectional configuration of the liquid crystal display device 70 when viewed in cross section along a Y-Z plane passing through spacer members 85a (85b). The third embodiment differs from the first embodiment in that the liquid crystal display device 70 includes board holding members 87 and in the form and layout of the spacer members 85a (85b). The other components are the same as those of the first embodiment described above. In FIG. 7, the members denoted by reference numeral obtained by adding the number 60 to the reference numeral of the corresponding member in FIG. 3 are identical with the members described in the first embodiment. Therefore, the description of the structure, operation, and effect thereof is omitted.

As shown in FIG. 7, in the third embodiment, the liquid crystal display device 70 includes the board holding members 87. The board holding members 87 has an inverted L-shaped cross section and is fixed to side plates 82b and 82c of a backlight chassis 82 provided above an LED board 90, and holds the LED board 90 in the direction vertical to a light entrance surface 80a1 (80a2) of a light guide plate 80. Further, the spacer members 85a (85b) are adhered to be fixed to the surface of each board holding member 87, for example, thereby being fixed thereto. The spacer members 85a (85b) have a handle shape that curves substantially annularly. The curved portion of each spacer member 85a (85b) abuts the light entrance surface 80a1 (80a2) of the light guide plate 80, thereby regulating the displacement of the light guide plate 80 to the side of LED light sources 88.

Figure 8:
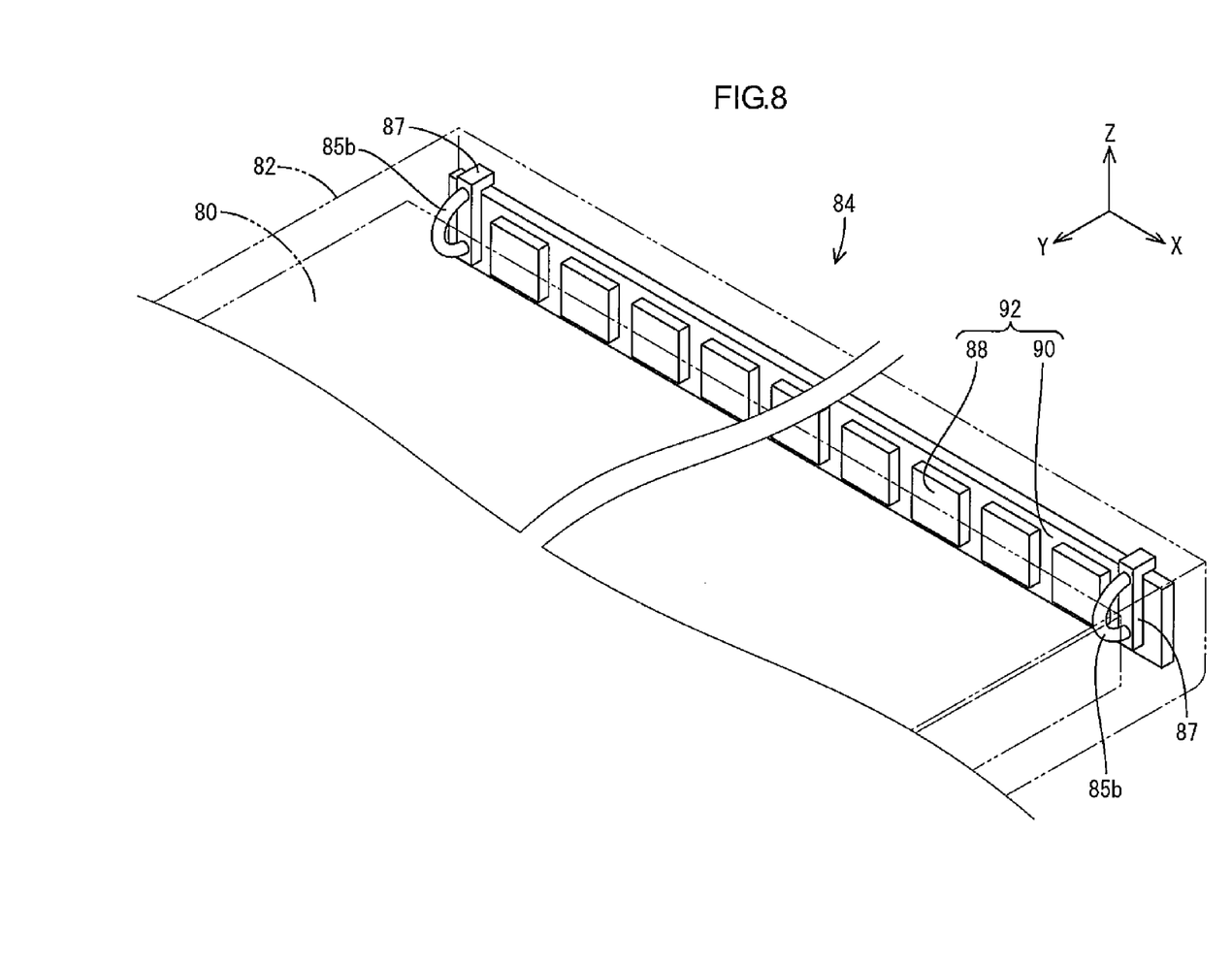
FIG. 8 shows a partially enlarged perspective view of a backlight unit 84 according to the third embodiment.

FIG. 8 shows a partially enlarged perspective view of a backlight unit 84. Note that in FIG. 8, the light guide plate 80 and the backlight chassis 82 are illustrated to be seen through for convenience of explanation. As shown in FIG. 8, the board holding members 87 and the spacer members 85a (85b) are arranged at both ends in the long-side direction of the backlight chassis 82. This prevents the light, which is emitted from the LED light sources 88 to the light entrance surface 80a1 (80a2) of the light guide plate 50, from being blocked by the spacer members 85a (85b).

In the backlight unit 84 according to the third embodiment, the spacer members 85a (85b) are arranged on the surface of each board holding member 87 holding the LED board 90. Accordingly, the spacer members 85a (85b) can be fixed to the backlight unit 84, while the LED board 90 is fixed to the surface of the backlight unit 84 through the board holding members 87.

Note that this embodiment illustrates an aspect in which the light source holding members 87 and the spacer members 85a (85b) are separate members. Alternatively, the spacer members 85a (85b) and the light source holding members 87 may be integrally formed to thereby form the spacer members 85a (85b) as a part of the light source holding members 87.

Fourth Embodiment

Figure 9:
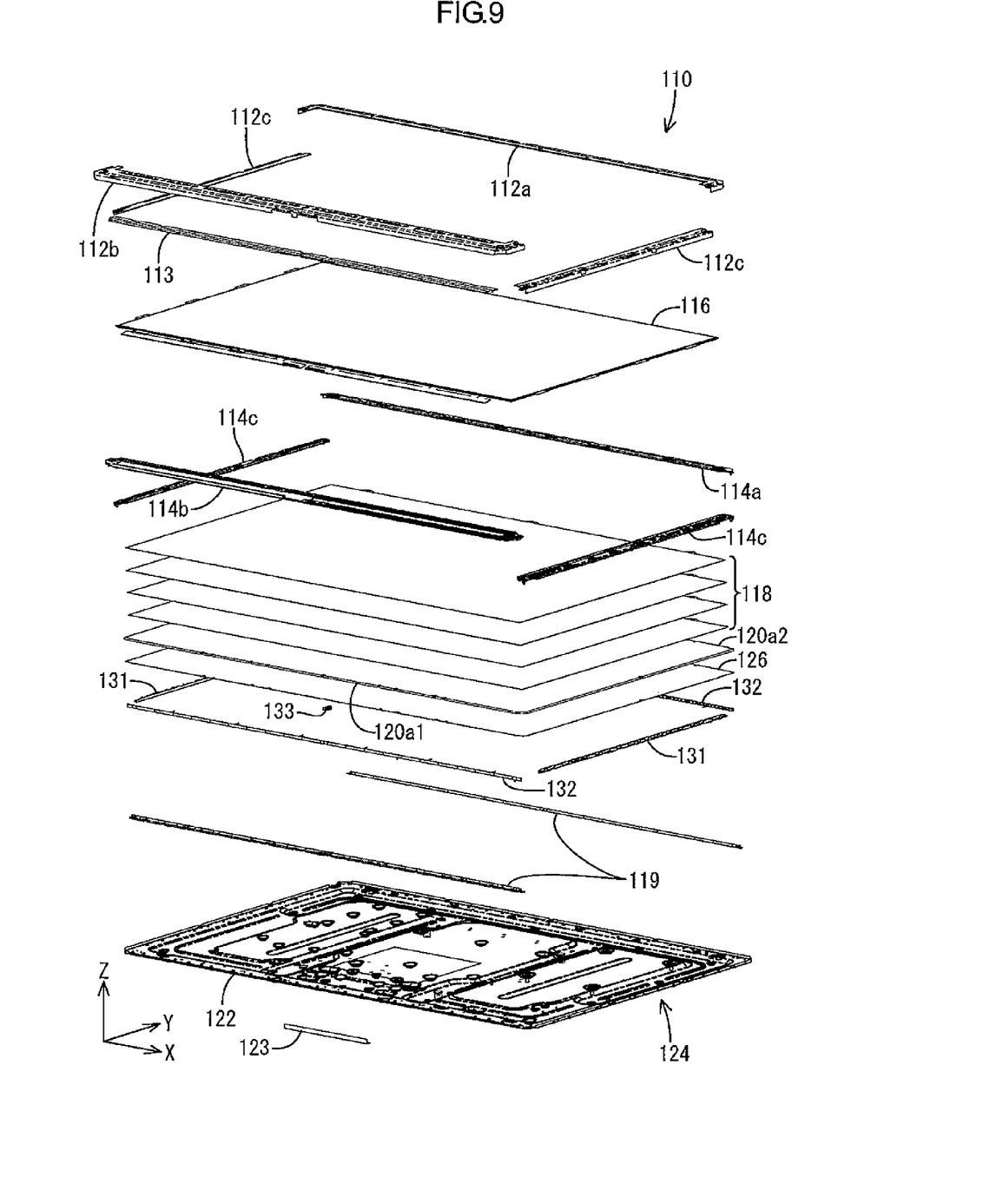
FIG. 9 shows an exploded perspective view of a liquid crystal display device 110 according to a fourth embodiment.
Figure 10:
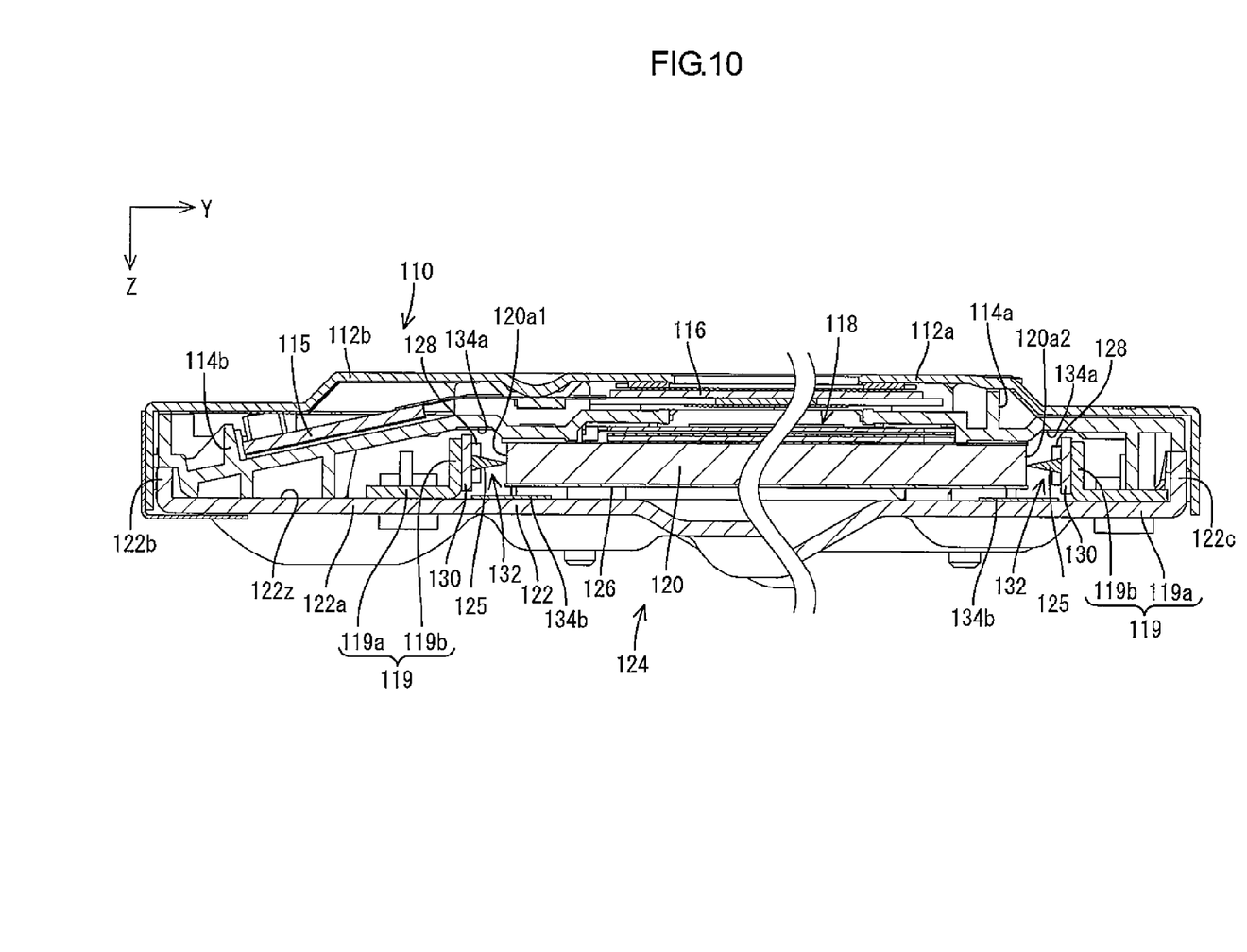
FIG. 10 is a sectional view of the liquid crystal display device 110.

FIG. 9 shows an exploded perspective view of a liquid crystal display device 110 according to a fourth embodiment. Herein, the upper side shown in FIG. 9 is assumed as the front side and the lower side shown in FIG. 9 is assumed as the back side. As shown in FIG. 9, the liquid crystal display device 110 has a horizontally-long rectangular shape as a whole, and includes a liquid crystal panel 116 serving as a display panel, and a backlight unit 124 serving as an external light source. These are integrally held by a top bezel 112a, a bottom bezel 112b, side bezels 112c (hereinafter referred to as a bezel group 112a to 112c), and the like. Note that since the structure of the liquid crystal panel 116 is similar to that of the first embodiment, the description thereof is omitted.

The backlight unit 124 will be described below. As shown in FIG. 9, the backlight unit 124 includes a backlight chassis 122, an optical member 118, a top frame 114a, a bottom frame 114b, side frames 114c (hereinafter referred to as a frame group 114a to 114c), and a reflection sheet 126. The liquid crystal panel 116 is sandwiched between the bezel group 112a to 112c and the frame group 114a to 114c. Note that reference numeral 113 denotes an insulating sheet insulating a drive circuit board 115 (see FIG. 10) driving the liquid crystal panel 116. The backlight chassis 122 is opened to the front side (light exit side; a side of the liquid crystal panel 116) and has a substantially box shape having a bottom surface. The optical member 118 is arranged on the front side of a light guide plate 120. The reflection sheet 126 is arranged on the back side of the light guide plate 120. The backlight chassis 122 houses a pair of cable holders 131, 131, a pair of radiator plates 119, 119 extending in the long-side direction of the backlight chassis 122, a pair of LED units 132, 132, extending in the long-side direction of the backlight chassis 122 and on which spacer members 125 (see FIG. 10) are arranged, and the light guide plate 120. The LED units 132, the light guide plate 120, and the reflection sheet 126 are supported by a rubber bush 133. A power supply circuit board (not shown) supplying power to the LED unit 132, a protective cover 123 protecting the power supply circuit board, and the like are attached to the back surface of the backlight chassis 122. The pair of cable holders 131, 131 is arranged along the short-side direction of the backlight chassis 122, and houses lines electrically connecting the LED units 132 and the power supply circuit board.

FIG. 10 shows a sectional view of the backlight unit 124. The sectional view of FIG. 10 shows a sectional configuration when the liquid crystal display device 110 is viewed in cross section along a Y-Z plane passing through the spacer members 125. As shown in FIG. 10, the backlight chassis 122 is formed of a bottom plate 122a having a bottom surface 122z, and side plates 122b and 122c rising a small distance from the outer edges of the bottom plate 122a, thereby supporting at least the LED units 132 and the light guide plate 120. The radiator plates 119 have an L-shaped cross section including a bottom surface portion 119a and a side surface portion 119b rising from one long-side outer edge of the bottom surface portion 119a. The radiator plates 119 are arranged along the direction of one long side of the backlight chassis 122. The bottom surface portion 119a of each radiator plate 119 is fixed to the bottom plate 122a of the backlight chassis 122. Accordingly, the LED units 132 are supported by the bottom plate 122a of the backlight chassis 122 through the radiator plates 119. The radiator plates 119 radiate heat generated in the LED units 132 to the outside of the backlight unit 124 through the bottom plate 122a of the backlight chassis 122.

As shown in FIG. 10, the light guide plate 120 is arranged between the pair of LED units 132, 132. The light guide plate 120 and the optical member 118 are sandwiched by the frame group 114a to 114c and the backlight chassis 122. Further, as shown in FIG. 10, the drive circuit board 115 is arranged on the front side of the bottom frame 114b. The drive circuit board 115 is electrically connected to the display panel 116 and supplies image data and various control signals necessary for displaying an image to the liquid crystal panel 116. Furthermore, reflection members 134a are arranged along the long-side direction of a light entrance surface 120a1 (120a2) of the light guide plate 120 at a portion exposed to the LED units 132 on the surface of each of the top frame 114a and the bottom frame 114b. Reflection members 134b are arranged along the long-side direction of the light entrance surface 120a1 (120a2) of the light guide plate 120 also at a portion facing the LED units 132 on the surface of the backlight chassis 122.

According to the backlight unit 124 of this embodiment, the reflection members 134a are arranged on the surface of each of the top frame 114a and the bottom frame 114b. Further, the reflection members 134b are arranged on the surface of the backlight chassis 122. This effectively enhances the incidence efficiency of the light emitted from the LED units 132 to the light guide plate 120.

The correspondence between the components of this embodiment and the components of the present invention is described. The LED light sources 28, 58, and 88 are examples of the "light source". The LED boards 30, 60, 90, and 130 are examples of the "light source board". The backlight units 24, 54, 84, and 124 are examples of the "lighting device". The liquid crystal display devices 10, 40, 70, and 110 are examples of the "display device". The backlight chassis 22, 52, 82, and 122 are examples of the "housing member".

Modified examples of the above embodiments are listed below.

(1) The above embodiments employ the configuration where the LED light source emitting white light is mounted. However, for example, a configuration where three types of LED light sources of red, green, and blue are surface-mounted may be employed, and more alternatively, a configuration where a blue LED light source and a yellow phosphor are combined may be employed.

(2) The above embodiments employ the configuration where the LED light sources are arranged on two side surfaces of the light guide plate facing each other. However, for example, a configuration where LED light sources are arranged on three side surfaces of the light guide plate may be employed, and more alternatively, a configuration where LED light sources are arranged on all (four) side surfaces of the light guide plate may be employed.

(3) Though the above embodiments employ the configuration where the spacer members are adhered to be fixed to the LED board and the like, the method of fixing the spacer members is not limited thereto. For example, in the first embodiment described above, the spacer members may be screwed through the LED board and the backlight chassis, thereby being fixed to the surface of the LED board.

(4) In addition to the above embodiments, the layout, form, and the like of the spacer members can be arbitrarily changed.

(5) Though the above embodiments illustrate the liquid crystal display device using a liquid crystal panel as a display panel, the present invention can also be applied to display devices using other types of display panels.

(6) Though the above embodiments illustrate the television receiver including a tuner, the present invention can be also applied to display devices including no tuner.

Though embodiments of the present invention have been described above, these are illustrative only and do not limit the scope of the claims. The techniques set forth in the scope of the claims include various modifications and changes of the specific examples illustrated above.

The technical elements described in the specification of the present invention or the drawings provide technical utility either independently or through various combinations, and are not limited to the combinations set forth in the claims originally filed. Additionally, the techniques illustrated in the specification of the present invention or the drawings can attain a plurality of objects at the same time, and attainment of one of the objects itself provides technical utility.

EXPLANATION OF SYMBOLS

TV: Television receiver
Ca, Cb: Cabinet
T: Tuner
S: Stand
10, 110: Liquid crystal display device
12: Bezel
14: Frame
16, 116: Liquid crystal panel
18, 118: Optical member
18a: Diffuser plate
18b: Diffuser sheet
18c: Lens sheet
18d: Reflection type polarizing plate
20, 50, 80, 120: Light guide plate
20a1, 20a2, 50a1, 50a2, 80a1, 80a2, 120a1, 120a2: Light entrance surface
20b, 50b, 80b: Light exit surface
20c, 50c, 80c: Surface opposite to light exit surface
22, 52, 82, 122: Backlight chassis
22a, 52a, 82a, 122a: Bottom plate
24, 54, 84, 124: Backlight unit
25a, 25b, 55a, 55b, 85a, 85b, 125: Spacer member
26, 56, 86, 126: Reflection sheet
28, 58, 88: LED light source
30, 60, 90, 130: LED board
32, 62, 92, 132: LED unit
112a: Top bezel
112b: Bottom bezel
112c: Side bezel
113: Insulating sheet
114a: Top frame
114b: Bottom frame
114c: Side frame
115: Drive circuit board
119: Radiator plate
123: Protective cover
131: Cable holder
134a, 134b: Reflection member

The invention claimed is:

1. A lighting device comprising:
a light source board;
a light source arranged on a surface of the light source board;
a light guide plate formed in a flat plate shape having side surfaces that are provided on opposite sides of the light guide plate and including light entrance surfaces on the side surfaces, each of the light entrance surfaces being arranged to face the light source of the light source board; and
spacer members configured to regulate a distance between the light source board and the light guide plate, each of the spacer members having Young's modulus smaller than Young's modulus of the light guide plate; wherein
each of the spacer members includes a plate spring that is elastically deformed in a direction vertical to the light entrance surfaces of the light guide plate.

2. The lighting device according to claim 1, wherein Young's modulus of the spacer member provided close to one of the light entrance surfaces of the light guide plate is different from Young's modulus of the spacer member provided close to another one of the light entrance surfaces of the light guide plate.

3. The lighting device according to claim 1, wherein elastic modulus of the plate spring of the spacer member provided close to one of the light entrance surfaces of the light guide plate is different from elastic modulus of the plate spring of the spacer member provided close to another one of the light entrance surfaces.

4. The lighting device according to claim 1, further comprising a housing member housing at least the light source board and the light guide plate,
wherein the spacer members are arranged on a surface of the housing member between the light source board and the light guide plate, and the spacer members are fixed to the housing member.

5. The lighting device according to claim 4, further comprising a board holding member fixed to the surface of the housing member and configured to hold the light source board,
wherein the spacer members are arranged on the surface of the board holding member.

6. The lighting device according to claim 1, wherein the spacer members arranged close to one of the light entrance surfaces of the light guide plate and the spacer members arranged close to another one of the light entrance surfaces are arranged in a mirror symmetrical manner.

7. The lighting device according to claim 1, wherein the spacer members and the light guide plate abut each other with no load applied between the spacer members and the light guide plate under a temperature condition of 25° C.

8. The lighting device according to claim 1, further comprising a reflection member arranged between the light source and the light guide plate, wherein each of the light entrance surfaces is formed in an elongated shape and the reflection member is arranged along a longitudinal direction of the light entrance surface.

9. A display device comprising a display panel performing display using light from the lighting device according to claim 1.

10. The display device according to claim 9, wherein the display panel is a liquid crystal panel using a liquid crystal.

11. A television receiver comprising a display device according to claim 9.

* * * * *